3,073,800
PREPARATION OF MODIFIED CYCLIC UREA RESINS

George Shiu Yim Poon, Charlotte, N.C., assignor to Standard Chemical Products, Inc., Hoboken, N.J., a corporation of New Jersey
No Drawing. Filed Feb. 3, 1959, Ser. No. 790,797
10 Claims. (Cl. 260—69)

This invention relates to modified trimethylene urea, modified ethylene urea, formaldehyde condensation products and to a process for the preparation of such products. These products are useful in the treatment of cellulosic and other textile materials to impart crease resistance and dimensional stability to these materials.

It is known in the prior art to prepare ethylene ureas by reacting urea with ethylene diamine or its homologues. Similarly, trimethylene ureas can be prepared in the same manner by reacting urea and 1,3 diaminopropane and its homologues. In accordance with these processes the reaction of the diamines and ureas are carried to completion at temperatures in the range of about 200° C. to 280° C.

Under normal conditions on heating urea and a diamine together in equimolar quantities, prior to the formation of the ring compound, an unworkable solid mass is formed at about 150° C. to 180° C. At this stage uniform heating and evolution of ammonia are difficult. Often times explosive bumping, in addition to charring due to localized heating, presents a serious problem.

United States Patent 2,436,311 discloses a high pressure process of reacting ethylene diamine and urea. United States Patent 2,517,750 discloses preparation of ethylene urea with an excess of ethylene diamine to avoid the formation of a solid mass. United States Patent 2,825,732 employs a solvent such as ethylene glycol to keep the reactants from solidification. Similarly, the above mentioned methods of the preparation of ethylene urea can be applied to the preparation of trimethylene urea.

It has now been ascertained that the above disadvantages of the prior art processes may be avoided if the urea is reacted with a mixture of a 1,3 diaminopropane and an ethylene diamine in a manner more fully described below. The reaction product resulting from this reaction may then be reacted with formaldehyde, yielding a methylol derivative which can be used to impart crease-proofing properties to cellulosic fabrics.

It is accordingly an object of the present invention to prepare a trimethylene urea, ethylene urea, formaldehyde condensation product which can be used to impart crease-proofing properties to cellulosic fabrics. Such ethylene urea or trimethylene urea resin, in accordance with the invention, is made without employing a solvent as fluidizing agent, or the disadvantage of complete solidification during the reaction.

It is also an object of the present invention to provide a process for the manufacture of such a product.

It is still a further object of the present invention to provide modified trimethylene ureas and ethylene ureas which may be readily condensed with formaldehyde through the use of formaldehyde.

It is a further object of the present invention to provide a process for the preparation of modified trimethylene ureas and ethylene ureas.

Other and more detailed objects of this invention will be apparent from the following description and claims.

It has been found that one mole of urea can be reacted with a mixture of a 1,3 diaminopropane and an ethylene diamine in various proportions depending on the end use of the final product for the treatment of textiles. Such a system prevents the formation of a dry solid mass and instead the reactants form moist workable semi-soilds with a liquid layer usually present before the completion of the reaction at 240° C. to 280° C. As the reaction reaches completion, the product is always a clear liquid which solidifies on cooling.

The gist of the invention is to provide an intermediate for preparing crease-proofing agents of the cyclic urea type without employing high-pressure special equipment or a solvent. The solidification into an unworkable mass and bumping during the reaction which are characteristic of prior art processes are avoided in the present process.

It will be understood that the instant process of preparation of modified cyclic ureas is not limited to the use of 1,3 diaminopropane and ethylene diamine. Any combinations of a 1,3-alkylene polyamides and a 1,2 alkylene polyamine can be employed, including the use of more than two amines. More specifically, there is employed the combination of a compound having a pair of amino nitrogen atoms (preferably primary amine) in the 1,3 or alternate carbon atoms with a compound having a pair of amino nitrogen atoms (preferably primary amine) in the 1,2 or adjacent carbon atoms.

More particularly, the 1,3 diaminopropanes which may be used in the present invention may be defined by the general formula:

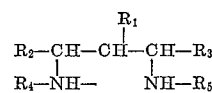

wherein $R_1$, $R_2$ and $R_3$ are the same or different and may be hydrogen, alkyl, (preferably lower alkyl), hydroxyl or hydroxyalkyl (preferably lower hydroxyalkyl groups) groups and wherein $R_4$ and $R_5$ are hydrogen or alkyl groups (preferably lower alkyl groups), with either $R_4$ or $R_5$ being hydrogen.

The ethylene diamines which may be used in accordance with the present invention may be described by the general formula:

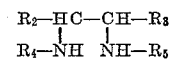

wherein $R_2$ and $R_3$ may be hydrogen, alkyl (preferably lower alkyl), hydroxyalkyl (preferably lower hydroxyalkyl) or hydroxyl groups and $R_4$ and $R_5$ are hydrogen or alkyl groups, preferably lower alkyl groups, with preferably either $R_4$ or $R_5$ being hydrogen.

As used herein the term ureas covers both urea, thiourea as well as the corresponding substituted compounds.

By way of example the 1,2 diamines or ethylene diamines which may be used in accordance with the present invention may be mentioned: ethylenediamine; 1,2-diaminopropane; 1,2-butylenediamine; 2,3-diaminobutane; 2-methyl-1,2-diaminobutane; 1 - ethylamino - 2 - aminobutane; 3-ethylamino-2-methyl-2-aminopropane, etc. Other diamines, such as hydroxyethyl ethylene diamine, diethylene triamine, triethylene tetramine etc. may be used.

Among the 1,3 diamines which may be used in accordance with the present invention may be mentioned 1,3-diaminopropane, 1,3-diaminopropanol-2 as well as the homologues of these compounds; 2,2-dimethyl 1,3 propane diamine etc. In accordance with the present invention, the relative proportions of the 1,3-diaminopropane and the ethylenediamine may be varied within a wide range. In general, however, the combined molar proportions of the diamines are equal to the molar proportion urea employed. Thus, for example, from 9/10 to 1/10 of a mole of a 1,3 diaminopropane mixed with from about 9/10 to 1/10 of a mole of ethylenediamine are reacted with each mole of urea employed, the total molar quantity of diamines being preferably one mole or slightly in excess of one mole.

It is within the contemplation of the invention to employ 1 mole of amine, such as triethylene tetramine for 2 moles of urea, as, for instance, in Example No. 11 of United States Patent No. 2,517,750 to form the dicyclic compound which can be incorporated with a trimethylene urea.

The temperature of reaction employed in reacting the 1,3 diaminopropane and the ethylene diamine with the urea will vary with the particular reactants employed. However, in general it may be stated that the reaction may be carried out in the temperature range of about 100° C. to 280° C.

The product prepared by reacting the 1,3 diaminopropane and the ethylene diamino with urea is used to prepare a condensation product of a methylol compound by reacting the said product with formaldehyde. The quantity of formaldehyde employed will vary with the quantity of urea 1,3 diamine and 1,2 diamine used. Generally from 1 mole to 3 moles of formaldehyde per mole of urea used in the preparation of the original condensation product will be used. Preferably about 2 moles of formaldehyde are employed for each mole of urea employed in the primary condensation reaction.

The conditions under which the reaction may be carried out will also vary considerably. It is preferred, however, to carry out the condensation in a slightly basic medium and at a temperature in range of about 60° C. to (at reflux) approximately 100° C. The temperature is about 90° C., and the pH condition of the condensation reaction may be neutral, acidic or basic, preferably on the basic side from pH 7.5 to 10.0. After the completion of the condensation reaction, the pH of the final product is preferably adjusted to neutral (7.0 to slightly basic (7.5).

This invention offers advantages in the preparation of modified trimethylene ureas and modified ethylene ureas. Furthermore, condensation products of these modified compounds with formaldehyde when used in the treatment of cellulose fabrics have equal or better physical properties than the pure parent cyclic ureas condensates.

Some of the advantages are as follows:

(1) No expensive high-pressure equipment is necessary.

(2) No solvent is necessary which often gives side reactions and undesirable impure by-products causing discoloration both to the final formaldehyde condensation product and to the treated fabric. Preparation of ethylene urea by the use of glycol as a fluidizing liquid has these defects. In addition, the impure by-products of such process also buffer the final ethylene urea and formaldehyde condensate which tends to neutralize the effectiveness of the catalyst used for curing these resins during application. The same difficulties are encountered in the preparation of trimethylene urea employing a solvent such as glycols as a liquidizing medium.

(3) No purification step is necessary.

(4) Excellent crease-proofing aminoplast agents can be made from these cyclic urea intermediates.

The following examples are further illustrative of the present invention. However, it is to be understood that this invention is not restricted thereto.

EXAMPLE 1

60 parts urea (1 mole)
55.5 parts 1,3-diaminopropane (0.75 mole)
15.3 parts ethylene diamine 98% (0.25 mole)

The above mixture was refluxed in a round bottom flask equipped with a heating mantle and a glass condenser. At about 160° C. a semi-solid crystalline material began forming and reached a maximum at 190–200° C. with a liquid layer at the bottom of the flask. There was always the presence of this liquid layer during the formation of the moist semi-solid crystals.

The crystalline semi-solid gradually disappeared starting approximately at 220° C. The reaction reached completion at about 250° C. At this point the reaction mixture was a clear liquid which solidified on cooling. There was no bumping or scorching during the entire course of the reaction which took approximately 3½ hours to complete. The product was allowed to cool to about 100° C. after which 162 parts of 37% formaldehyde (2 moles) at a pH of 9.5 were added. The mixture was allowed to react at about 90° C. for about 30 minutes until all crystals disappeared, after which the reaction was carried on for another 15 to 20 minutes. The final product was cooled and adjusted to a pH of 7.0 to 7.5 and the yield was 248 parts.

EXAMPLE 2

The procedure of Example 1 was followed using the following proportion of reagents:

60 parts urea (1 mole)
49.4 parts 1,3 diaminopropane (0.666 mole)
20.5 parts ethylene diamine, 98% (0.344 mole)

The yield obtained was 246 parts of reaction product.

EXAMPLE 3

60.0 parts urea
48.9 parts ethylene diamine (98% sol'n) (0.8 mole)
14.8 parts 1,3 diaminopropane (0.2 mole)

The above mixture was refluxed in the same manner as in Example #1. The reacting mixture became cloudy at about 160° C. The cloudiness reached an optimum at about 175–180° C. and at this point the reaction mixture was a stirrable white slurry. The cloudiness started to disappear at about 180° C. Heating was continued to 240° C., and at this point, the product was a clear liquid, which solidified on cooling.

The condensation reaction to form the methylol compound was carried out at about 70° C. by reacting with 162 parts 37% formaldehyde solution at a pH of 9.0 until all solids were dissolved to give a clear liquid product. This product was cooled and the pH was adjusted to pH 7.0–7.5 by the addition of dilute hydrochloric acid solution. The yield was 243 parts. The following experiments were carried out to demonstrate the effectiveness of the present compositions.

Cotton gingham fabric was impregnated with a 10% solution of the products of Examples 1 and 2, with the addition of 1½% Catalyst No. 100 which is approximately a 40% solution of zinc nitrate hexahydrate buffered with an amine hydrochloride solution. For comparison, the same type of fabric was resin treated with a solution of 10% Stanset D–40 (a modified melamine formaldehyde condensate), 1½% Catalyst No. 100, and also a 10% solution of Stanset No. 120 (a modified triazone formaldehyde condensate) plus 2% Catalyst No. 100. The impregnated samples were air-dried, after which they were cured at 320° F. for 70 seconds. The results were as follows:

INITIAL

| | Monsanto Crease | | Trapizoid F. | |
|---|---|---|---|---|
| | Angle | W & F Wet | F. Tear, Lbs. | Tensile, Lbs. |
| 1. Stanset D–40 | 269 | 241 | 1.85 | 24.7 |
| 2. Stanset No. 120 | 258 | 235 | 1.80 | 25.6 |
| 3. Example 1 | 283 | 241 | 1.40 | 22.3 |
| 4. Example 2 | 270 | 254 | 1.70 | 22.6 |

AFTER 5 SANFORIZED WASHES (ACCORDING TO A.A.T.C.C. STANDARD TEST METHOD 14–1953)

| | | | | |
|---|---|---|---|---|
| 1. Stanset D40 | 221 | 241 | 2.30 | 28.7 |
| 2. Stanset No. 120 | 237 | 246 | 2.00 | 27.4 |
| 3. Example 1 | 240 | 248 | 1.90 | 25.9 |
| 4. Example 2 | 235 | 254 | 1.95 | 26.5 |

DAMAGE DUE TO RETAINED CHLORINE

|  | Initial [1] percent | After 5 Sanforized Washes,[2] percent |
|---|---|---|
| 1. Stanset D-40 | 0 | 41 |
| 2. Stanset No. 120 | 4 | 35 |
| 3. Example 1 | 2 | 0 |
| 4. Example 2 | 12 | 0 |

[1] AATCC Tentative Method 69-1952.
[2] AATCC Revised Method October 1, 1958.

REFLECTANCE

|  | Mild Washed After Curing | 60 Secs. 365° F. Suter Scorch | After 5 Sanf. Wash. | A | B | C | D | E |
|---|---|---|---|---|---|---|---|---|
| 1. Stanset D-40 | 82.0 | 80.2 | 77.5 | 82.3 | 80.2 | 79.7 | 79.3 | 75.7 |
| 2. Stanset No. 120 | 83.0 | 80.5 | 80.5 | 83.5 | 79.0 | 82.8 | 73.0 | 85.7 |
| 3. Example 1 | 81.8 | 80.8 | 80.5 | 83.3 | 81.5 | 82.5 | 82.3 | 85.5 |
| 4. Example 2 | 82.5 | 81.5 | 80.5 | 83.3 | 83.3 | 82.3 | 82.0 | 85.5 |

Note.—Reflectance measured by Photovolt Reflectometer, blue filter:
(A) Reflectance after cloroxing in AATCC Chlorine Retention Test Before scorching.
(B)(A) Scorched.
(C) After 5 sanforized washings, then cloroxed.
(D)(C) Scorched.
(E)(A) Cloroxed at 140° F. instead of at room temperature.

It has been known that a cotton fabric which has been resin treated with N,N'-dimethylol ethylene urea may exhibit no loss in strength due to retained chlorine by proper curing and by the use of a proper catalyst such as zinc nitrate. However, on repeated washings (such as sanforized washing) the percentage loss in strength due to retained chlorine increases to a level of over 50% to as high as 90%.

Samples treated by preparations from Examples 1 and 2 exhibit absolutely no degradation caused by retained chlorine after 5 sanforized washes. There is also no discoloration after being cloroxed and subsequently scorched, and no discoloration when cloroxed at an elevated temperature.

It has been also found that in order to have little or no chlorine retention on the treated fabric after repeated washing, the ratio of the ethylene diamine and 1,3 diaminopropane must be properly balanced. The optimum molar ratio of ethylene diamine 1,3 diamino propane is approximately 0.4/0.6 based on unit mole of urea. This optimum molar ratio varies in different combinations of reactants. It can easily be understood that in the preparation of this modified cyclic urea resin, which has no chlorine retention, it is advantageous to use an optimum molar ratio approaching one to one. In this manner the ratio provides the maximum advantages of keeping the reactants in a more fluid form during the reaction. From the cost standpoint, it is more economical to use the maximum amount of ethylene diamine permissible without introducing chlorine retention.

As the molar ratio of ethylene diamine/1,3 diaminopropane increases, the chlorine retention after repeated washing would also expect to increase. A modified cyclic urea resin can be prepared with equal or somewhat better performance and properties in comparison with pure ethylene urea resin. It will be understood that in this case again the maximum amount of ethylene diamine should also be used. The amount of 1,3 diaminopropane present should be just enough to give the advantage of preventing complete solidification during the reaction.

The preparation shown embodies the invention in a preferred form, but it is intended that the disclosure be illustrative rather than definitive, the scope of the invention being defined in the appended claims.

I claim:

1. A process for the preparation of a modified cyclic urea product useful in the preparation of crease-proofing compositions which comprises heating to 180° to 280° C. at substantially atmospheric pressure a urea having the formula

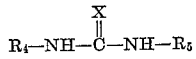

wherein $R_4$ and $R_5$ are selected from the group consisting of hydrogen and lower alkyl and X is selected from the group consisting of oxygen and sulfur with an equimolar amount of a mixture of 0.1 to 0.9 mole per mole of said urea of an ethylene diamine selected from the group consisting of ethylene diamine, 1,2-diaminopropane, 1,2-butylene diamine, 2,3-diaminobutane, 2-methyl-1,2-diaminobutane, 1-ethylamino-2-aminobutane, 3-ethylamino-2-methyl-2-aminopropane, hydroxyethyl ethylene diamine, diethylene triamine and triethylene tetramine and 0.9 to 0.1 mole per mole of said urea of a 1,3-diaminopropane selected from the group consisting of 1,3-diaminopropane, 1,3-diaminopropanol-2 and 2,2-dimethyl-1,3-diaminopropane and recovering the said product.

2. The process of claim 1 wherein the molar ratio of the said ethylene diamine and said 1,3-diaminopropane is about 0.4/0.6 per mole of the said urea.

3. The process of claim 1 wherein 1,3-diaminopropane and ethylene diamine are condensed with urea.

4. The process of claim 1 wherein 1,3-diaminopropanol and ethylene diamine are condensed with urea.

5. The process of claim 1 wherein 1,3-diaminopropane and triethylene tetramine are condensed with urea.

6. A process according to claim 1 wherein 1,3-diaminopropanol and triethylene tetramine are condensed with urea.

7. A process for the preparation of a crease-proofing composition which comprises heating to 180° to 280° C. at substantially atmospheric pressure a urea having the formula

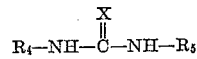

wherein $R_4$ and $R_5$ are selected from the group consisting of hydrogen and lower alkyl and X is selected from the group consisting of oxygen and sulfur with an equimolar amount of a mixture of 0.1 to 0.9 mole per mole of said urea of an ethylene diamine selected from the group consisting of ethylene diamine, 1,2-diaminopropane, 1,2-butylene diamine, 2,3-diaminobutane, 2-methyl-1,2-diaminobutane, 1-ethylamino-2-aminobutane, 3-ethylamino-2-methyl-2-aminopropane, hydroxyethyl ethylene diamine, diethylene triamine and triethylene tetraamine and 0.9 to 0.1 mole per mole of said urea of a 1,3-diaminopropane selected from the group consisting of 1,3-diaminopropane, 1,3-diaminopropanol-2 and 2,2-dimethyl-1,3-diaminopropane to form a modified cyclic urea, reacting the latter with 1 to 3 moles of formaldehyde at temperatures from about 60° C. to reflux and recovering the said crease proofing composition.

8. The process of claim 7 wherein ethylene diamine and 1,3-diaminopropane are condensed with urea.

9. The product produced by the process of claim 7.
10. The product produced by the process of claim 8.

References Cited in the file of this patent

UNITED STATES PATENTS

| | | |
|---|---|---|
| 2,145,242 | Arnold | Jan. 31, 1939 |
| 2,436,311 | Larson et al. | Feb. 17, 1948 |
| 2,517,750 | Wilson | Aug. 8, 1950 |
| 2,825,732 | Wayland | Mar. 4, 1958 |
| 2,852,494 | Lehmann et al. | Jan. 26, 1958 |
| 2,881,152 | Conn et al. | Apr. 7, 1959 |

UNITED STATES PATENT OFFICE
CERTIFICATE OF CORRECTION

Patent No. 3,073,800 January 15, 1963

George Shiu Yim Poon

It is hereby certified that error appears in the above numbered patent requiring correction and that the said Letters Patent should read as corrected below.

Column 1, line 71, for "semi-soilds" read -- semi-solids --; column 2, line 14, for "polyamides" read -- polyamines --; column 3, line 33, for "(7.0" read -- (7.0) --; column 4, line 20, for "(0.344 mole)" read -- (0.334 mole) --.

Signed and sealed this 20th day of August 1963.

(SEAL)
Attest:

ERNEST W. SWIDER
Attesting Officer

DAVID L. LADD
Commissioner of Patents